United States Patent [19]

Bhat et al.

[11] Patent Number: 4,912,323

[45] Date of Patent: Mar. 27, 1990

[54] METHOD FOR CREATING RADON-IN-WATER STANDARDS

[75] Inventors: Ramachandra K. Bhat; Janine P. Guadagno, both of Springfield, Va.

[73] Assignee: The United States of America as represented by the Secretary of the Army, Washington, D.C.

[21] Appl. No.: 295,325

[22] Filed: Jan. 10, 1989

[51] Int. Cl.$^4$ ............... G01V 5/00; G01T 1/169
[52] U.S. Cl. ............................ 250/252.1; 250/253
[58] Field of Search ................. 250/252.1, 253; 73/861.09

[56] References Cited

PUBLICATIONS

Hutchinson et al., "The NBS Radon-in-Water Standard Generator" Nucl. Instr. & Meth. in Phys., A247 (1986), pp. 385-389.

*Primary Examiner*—Janice A. Howell
*Assistant Examiner*—Richard Hanig
*Attorney, Agent, or Firm*—Anthony T. Lane; Milton W. Lee

[57] ABSTRACT

This invention relates to a method for preparing radium-free standard solutions of radon-222-in-water of known concentration for use in the more accurate calibrating of liquid scintillation counters than obtainable by the use of radium-226 as standards for calibration. A radium-free radon-in-water standard of the type contemplated herein is defined as a known volume of deionized water with a known activity of radon gas without the presence of any radium activity. This new method provides for the rapid, accurate and inexpensive analysis of Radon-222 water samples by utilizing standards whose activity is derived from actual instrumental quantitative analysis as opposed to problematical mathematical derivation. Using a glass jar generator apparatus, this method generates with a few days a radium-free radon-222-in-water standard whose concentration is determined by gamma spectroscopy using one sample portion of the standard; and at the same time, using cocktail diluted mixtures of plural sample portions of the same standard to calibrate simultaneously one or several liquid scintillation systems.

3 Claims, 2 Drawing Sheets

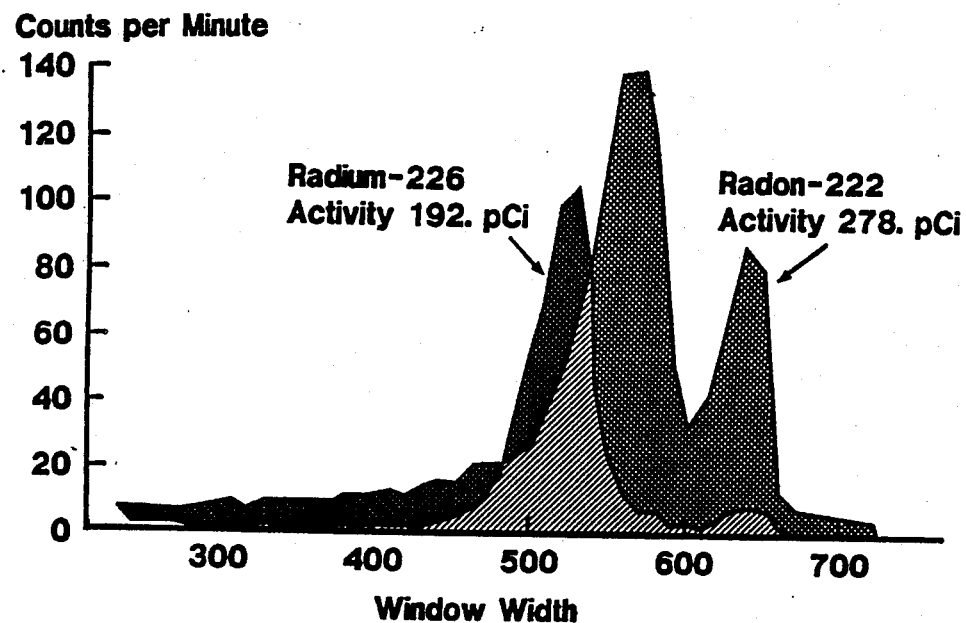
FIG. 1
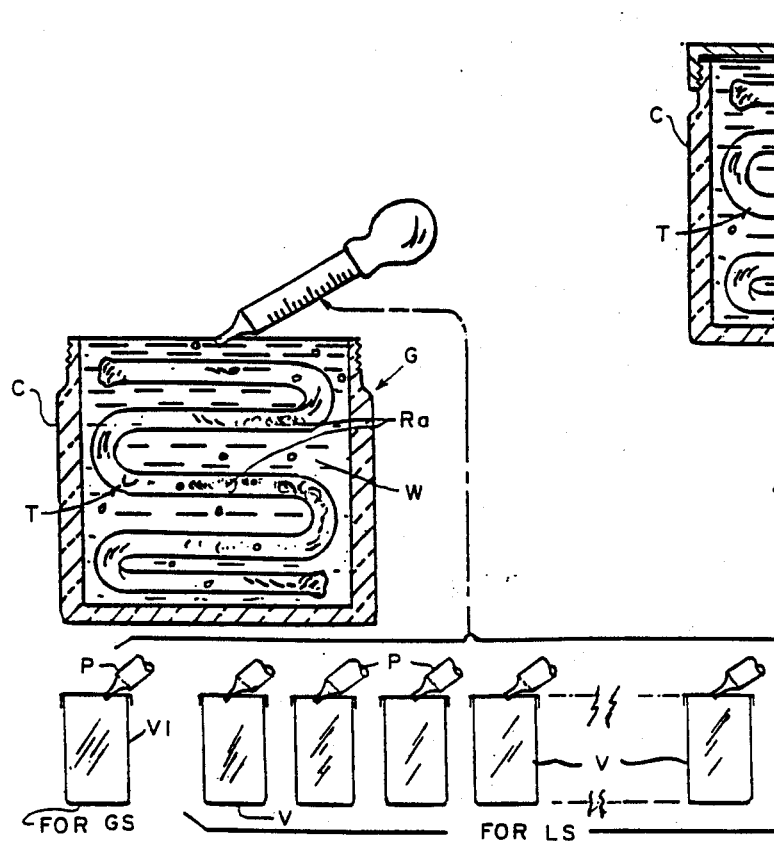
FIG. 2
FIG. 3

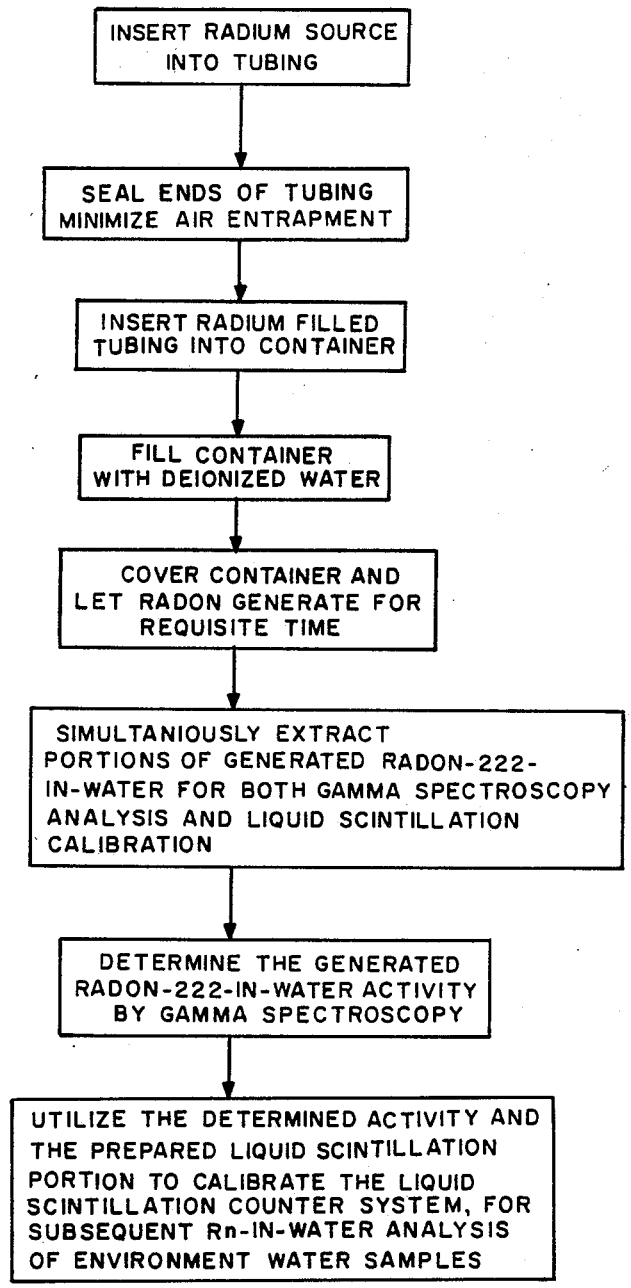
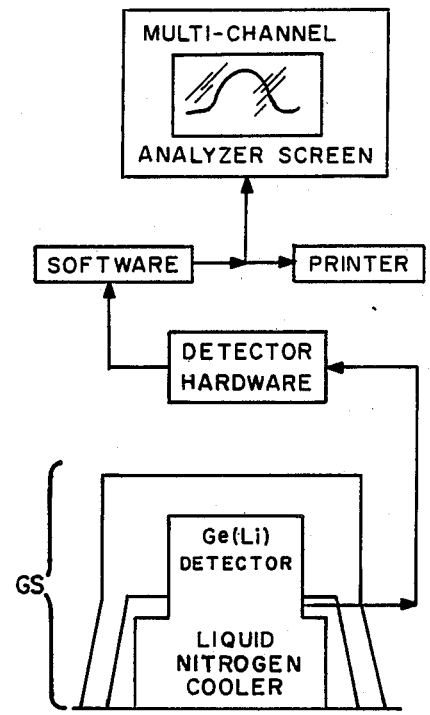
FIG. 4
FIG. 5

METHOD FOR CREATING RADON-IN-WATER STANDARDS

GOVERNMENT INTEREST

The invention described herein may be manufactured and used by or for the U.S. Government for Governmental purposes without the payment of any royalties thereon, and is being assigned to the U.S. Government.

BACKGROUND OF THE INVENTION

This invention relates to a method for preparing radium-free standard solutions of radon-222-in-water (the radon-222 being referred to as Rn hereafter) of known concentration for use in calibrating liquid scintillation counters. A radium-free radon-in-water standard of the type contemplated herein is defined as a known volume of deionized water with a known activity of radon gas without the presence of any radium activity.

Rn is radioactive gas which is formed during the radioactive decay of radium-226 (referred to as Ra hereafter). Ra is found in trace concentrations in many rock formations. It has a long half-life of about 1620 years. Rn, on the other hand, has a half-life of only 3.823 days.

Rn gas found in the air in energy-efficient dwellings has raised concern because of its carcinogenic effects. It is believed that most lung cancer among non-smokers is caused by exposure to excessive concentrations of Rn in indoor air. Health statisticians reportedly attribute 5,000 to 30,000 lung cancer deaths per year to Rn gas exposure. These figures, which are less than fatalities caused by cigarette smoking, but greater than those caused by asbestos, have generated a strong demand from the scientific community to produce accurate reproducible, quantitative and qualitative measuring techniques for Rn.

Rn is relatively soluble in water (51 cc of Rn per 100 cc of water in cold water) whereas Ra sulfate is virtually water-insoluble (less than 2 micrograms of Ra sulfate per 100 cc of water at 25 degrees C.). Thus, due to the proximity of ground water to geological strata that bear a precursor to Rn, i.e., Ra, it is therefore believed that well water is one of the mediums of transport for Rn into indoor air.

Current methods for detecting Rn in water using liquid scintillation measurements are calibrated mostly using Ra standards. Ra, however, is not likely to be present in water in the same abundance of Rn due to its relatively low solubility in water as compared to Rn. Ra and Rn standards do not produce identical spectrums in liquid scintillation (FIG. 1) and it is the spectrum produced that are used as the basis to determine the nuclide concentration. Therefore, liquid scintillation systems calibrated with Ra standards will not detect the activity as accurately as liquid scintillation systems calibrated with radium-free Rn standards.

Two known methods are principally used for determining Rn concentration in water: gamma spectroscopy and liquid scintillation counting. Gamma spectroscopy can detect and quantify individual radionuclides with a high degree of resolution. However, it involves long count times and the sampling procedure is cumbersome. Gamma spectroscopy, therefore, is a relatively slow and expensive method which is impractical when many samples of ground water must be analyzed for Rn content in a short time. Gamma spectroscopy, however, detects only gamma emitters. Because Rn is a pure alpha emitter and the gamma spectrometer can only detect gamma emitters, the activity of Rn is determined indirectly through the activity of its gamma emitting progeny, Bismuth-214 and Lead-214.

With that procedure, the coaxial Ge(Li) (a Germanium drifted Lithium) detector of the gamma spectrometer is calibrated using a National Bureau of Standards (NBS) traceable mixed gamma solution for a fixed Mason jar geometry, which is mentioned hereinafter.

Due to Rn's relatively short half-life of 3.823 days, the activity of the sample must be determined within one week of obtaining the sample. Samples analyzed later than this period will have decayed to the point that the original activity cannot be accurately detected. Therefore, the use of gamma spectroscopy analysis with a large number of samples is impractical.

On the other hand, as stated above, because Rn is a pure alpha emitter, it can be detected directly by the liquid scintillation method; therefore liquid scintillation counting is a relatively fast and inexpensive method for determining Rn concentration in water. The liquid scintillation system can count numerous samples in a short period of time and involves small sampling containers. However, liquid scintillation counters must be calibrated with Ra-free Rn-in-water standard solutions of known concentration. The method of generating said standards is the principal object of the present invention.

A prior art method of preparing Ra-free-Rn-in-water standard solutions is described by the National Bureau of Standards (NBS) in an article authored by Hutchinson, J. M. R., et. al., Nuclear Instruments and Methods in Physics Research A247 (1986) (385–389) in which a known amount of Ra is encapsulated in a plastic tube and inserted in a glass chamber filled with water. However, a mathematical relationship is used in their prior art system to calculate the Rn concentration in the solutions based on the diffusion coefficient between Rn and the plastic tubing in relation to time. Their apparatus must be carefully and thoroughly purged of Rn so that at time zero there is no Rn in the water in the accumaltor or in the plastic tubing holding the Ra. Also, a system constant must be established for each system, referred to as the source emanation power which depends on the relative masses of water and plastic in the system, and also on the solubility and diffusability of Rn in the plastic. This prior art method is exceedingly tedious, cumbersome and vulnerable to error.

OBJECT AND BRIEF SUMMARY OF THE INVENTION

It is the object of this invention therefore to provide a relatively inexpensive method for generating standard solutions of Ra-free Rn-in-water for more accurate claibration of liquid scintillation counters than achieved by the use of Ra as standards for calibration. Our new method provides for the rapid, accurate and inexpensive analysis of Rn water samples by utilizing standards whose activity is derived from actual instrumental quantitative analysis as opposed to problematical mathematical derivation.

The method of this invention, using a glass jar generator apparatus, generates within a few days a Ra free Rn-in-water standard whose concentration is determined by gamma spectroscopy using one sample portion of the standard; and at the same time, using another sample portion of the same standard to calibrate a liquid scintillation counter.

Our more preferred method comprises placing a known amount of Ra, in the form of a radium salt, such as radium nitrate in an excess of dilute nitric acid, in a plastic tube, sealing both ends of the plastic tube so as to minimize air entrapment, and placing the sealed tube containing the Ra in a glass jar filled with water and capped with a metal screw cap to prevent diffusion of Rn thru the container. Our alternate method is to encapsulate in solid form a predetermined amount of Ra salt.

Due to the generation of Rn by the radioactive decay of the Ra and the diffusion of Rn through the plastic wall of the tube, the concentration of Rn in the water in the glass jar builds up rapidly at first, then more slowly, until after about thirty days it levels off to a constant value. In accordance with the present invention, the water may be removed from the jar at any time after the first few days, and a sample portion of it analyzed by gamma spectroscopy to determine its Rn concentration. The radioactivity of the sample is quantified by the gamma spectroscopy system in the form of an electronic signal which is fed into a suitable multi-channel analyzer (MCA). In conjunction with the MCA, a software program, which is developed to read and convert the data into a desired type of unit activity, such as microcuries per milliliter, disintegrations per minute, or picocuries per milliter, thereafter is used to printout and/or display the activity. Another sample portion is used to calibrate simultaneously one or several liquid scintillation systems. An example of a customary method for calibrating liquid scintillation systems is to count a plurality of standard sample portions on a liquid scintillation system and to specify the activity of the spectrum, which are generated by the counting of said standards, to be the same as the activity determined by the gamma spectroscopy analysis.

The simultaneity of these two processes assures that the Rn concentrations in both sample portions of the solution are identical and that the concentration of the standard solution as determined by gamma spectroscopy is valid for the concentration of the solution used then to calibrate the liquid scintillation counters.

A further object of the invention is to provide a method using a glass jar generator apparatus of the above stated type, which can generate various Ra-free Rn-in-water standards of differing activities. The activity of Rn generated will depend upon the concentration of the Ra encapsulated, the wall thickness of the plastic tubing, the volume of water, the number of encapsulated tubes and the duration that the water is exposed to the emanating encapsulated Ra. Therefore, the user can generate various Ra-free Rn-in-water standards with the same generator by varying one or more of the above-stated variables.

The dimensions of generator apparatus material such as the plastic tubing will depend upon the desired volume and form of Ra encapsulated, and the diameter of the available flexible plastic tubing. The size of the container is dependent upon the desired volume of water and size and wall thickness of the selected tubing. An example of such requirements will be described hereinafter.

BRIEF DESCRIPTION OF DRAWINGS

FIG. 1 represents Liquid Scintillation Spectrums of Ra and Rn.

FIG. 2 is a cross-sectional view of an illustrative container-generator apparatus useable for generating a Rn-in-water standard;

FIGS. 3 and 4, are representative of steps to quantify the Rn activity to constitute a Ra-free Rn-in-water standard and;

FIG. 5 is a block diagram illustrative of the procedures for first making and than using a Rn-in-water generator apparatus and the generated standards thereof.

DETAILED DESCRIPTION OF PREFERRED EMBODIMENT

FIG. 1 is representative of the liquid scintillation spectrums of Ra and Rn which illustrates the inaccuracy inherent in using Ra generated spectrum to determine any Rn-in-water concentrations. This has been previously referred to in the foregoing BACKGROUND OF THE INVENTION portion of this application.

Referring next to the drawing FIG. 2, it is representative of a generator apparatus depicted generally as G, which comprises a suitable container C with removable cover or lid L, containing a sealed end tube T which encapsulates therein an amount of Ra, and which tube T is immersed in the preferably deionized water W which fills the container C. A 20 cm length of polyethylene tubing T, having a 3 mm O.D. and 2 mm I.D., has introduced therein, as by a pipette P, an amount of 470 microliters of a radium nitrate solution having a concentration of 18,000 picocuries (pCi) per milliliter of a 0.05 molar nitric acid. While one length of tubing is shown, it is contemplated that more than one such tube may be used in making a generator of this general type, depending upon the desired concentration of generated Ra-free Rn-in-water. The respective thickness of wall and diameter of tubing should also be important factors in determining the number of tubes.

The tubing may be tightly knotted, or otherwise suitably crimped and sealed, at both ends so as to minimize any air bubbles at both ends of the Ra solution. The tube T is then placed into a 40 milliliter glass jar container adaptable to receive a glass metal lid L, which may be the screw-on type, after the container is filled to the brim with deionized water W. The use of deionized water is preferred due to its low background radiation as compared to that of usual tapwater. The generator container material should be either glass or metal or other material which will prevent undue diffusion of Rn out of the generator. The volume of water for this exemplary generator is established by wieghing to be 38.89 gms, and the screw top lid L is firmly screwed onto the jar. After a requisite time period has passed, which time period is dependant upon the concentration of generated Rn, to allow adequate generation of a detectable amount of Rn-in-water, sample portions of the water are simultaneously extracted (see FIG. 3) and encapsulated in containers or vials V,VI, suitable for gamma spectroscopy and liquid scintillation analysis. The content of vial VI (FIG. 3) consists only of the Rn-in-water solution which will be analyzed on a gamma spectrometer GS (FIG. 4) to determine the generated Rn-in-water standard activity. The remaining vials V each contain either uniform or variable mixtures of the generated Rn-in-water standard and a suitable commercially available cocktail solution. These vials are then used to calibrate a liquid scintillation system LS (FIG. 3) to be used for the detection of Rn-in-water in environmental water samples.

Our improved method for creating Ra-free Rn-in-water standard is represented by the box diagram of FIG. 5, in which from the top down thru the first five boxes effectively portray the steps of (a) generating and utilizing a Rn-in-water generator which comprises a sealed tube of a Ra source material, which tube is fully immersed in preferably deionized water within a covered container of a type which limits the amount of Rn diffusion thru the container and its cover, and allowing the generator to function for a prerequisite time period during which the generated radon gas Rn diffuses through the immersed plastic tubing into the surrounding water until desired detectable level of Rn activity is achieved;

(b) thereafter simultaneously extracting at least first and second sample portions of the generated Rn-in-water;

(c) then depositing a first sample portion consisting only of the generated Rn-in-water into a pre-determined size first container or vial and covering same; while (d) simultaneously depositing at least one additional second sample portion and preferably several such sample portions of said generated Rn-in-water into respectively individual prepared-for scintillation containers or vials to be used as standards together with the activity of Rn-in-water of said generator for the subsequent calibrating of radioactive counting instruments such as liquid scintillation counting systems; and finally (e) determining the Rn-in-water activity of said first sample portion by a known gamma spectrometry procedure, and which activity is provided in data form, and which activity constitutes the activity of the standard by which other water samples may be measured to detect their Rn-in-water activity.

Another form of our novel methodology is for determining the concentration of presence of Rn-in-water which comprises of the steps of (a) generating a Rn-in-water standard from which sample portions will be removed for further processing in this method;

(b) determining the concentration of Rn gas in the generated standard by means of known gamma spectroscopy procedures using one sample portion of the generated standard;

(c) simultaneously calibrating a liquid scintillation system with another sample portion of said generated standard, and which scintillation system is used to quantify the radioactivity of Rn in unknown water samples; and (d) thereafter using a liquid scintillation system so calibrated to then determine any unknown presence or concentration of Rn in untested environmental samples of ground water.

Samples to be used in liquid scintillation counting systems must be prepared in a suitable manner known in the art involving the use of a predetermined cocktail solution. These known cocktail solutions are commercially available in various types. The sample portion prepared for gamma spectroscopy will be analyzed in manner known in the art to determine the activity of the Rn whose activity is also the activity to be used for the sample portion prepared for liquid scintillation. The liquid scintillation sample portions will be used as standards to calibrate the liquid scintillation system for detecting Rn-in-water in environmental water samples.

It should be noted that in our improved procedure and preferably using apparatus of the type described, no lengthy purging is required as in the prior art method of the National Bureau of Standards (NBS). No mathematical expression is used which contains a source emanation factor that is very time-consuming to establish and which must be reestablished every time the standard is generated. The procedure of this invention, without sacrificing measurement accuracy, will obviate these time-consuming steps of the NBS prior art. Prior art steps are readily subject to error due to extraneous variables.

The improved standard of the present invention is intended to be used primarily to quantify the presence of any Rn in ground water, however, it is not necessarily limited to such testing. It is also applicable to testing any water which may be susceptible to Rn containment, such as deionized water whose chamber may have concentrated Ra salts, or the verification of tap water purity.

While this invention has been described in terms of a specific embodiment and process thereof, other variations and modifications thereof will become apparent to those skilled in the art without departing from the scope of the appended claims.

What is claimed:

1. A method for creating Ra-free Rn-in-water standards, comprising the steps of
   (a) utilizing a Rn-in-water generator of the type which comprises a sealed tube encapsulating a Ra source material therein and which tube is immersed in water within a covered container which limits the amount of Rn diffusion through the container and its cover, and which generator has functioned for a requisite predetermined time period to have generated a quantifiable level of Rn activity;
   (b) simultaneously extracting at least first and second sample portions of the generated Rn-in-water from said generator;
   (c) depositing a first sample portion consisting only of the generated Rn-in-water into a predetermined size first container vial covering same;
   (d) simultaneously depositing at least one additional second sample portion said generated Rn-in-water into a prepared-for scintillation second container or vial to be used as standards together with the activity of Rn-in-water of said generator as determined through quantification of first sample activity by gamma spectroscopy for the subsequent calibrating of liquid scintillation systems;
   (e) determining the Rn-in-water activity of said first sample portion by a known gamma spectrometry procedure, said activity being provided in data form, and which activity constitutes the activity of the standard by which other water samples by be measured to quantify their Rn-in-water activity.

2. The method of claim 1
   wherein step (b) further includes simultaneously extracting a plurality of from about three to about twenty sample portions of said Rn-in-water from said generator; and
   wherein step (d) further includes depositing the respective additional sample portions in respectively separate prepared-for scintillation containers or vials.

3. A method for determining the concentration or presence of Rn-in-water comprising of the steps of (a) generating a Rn-in-water standard from which sample portions will be removed for further processing in this method;
(b) determining the concentration of Rn gas in the generated standard by means of known gamma spectroscopy procedures using one sample portion of the generated standard;
(c) simultaneously calibrating a liquid scintillation system with another sample portion of said generated system, and which scintillation system is used to quantify the radioactivity of Rn in unknown water samples; and
(d) thereafter using a liquid scintillation system so calibrated to then determine any unknown presence or concentration of Rn in untested environmental samples of ground water.

* * * * *